United States Patent [19]
Lebby et al.

[11] Patent Number: 5,539,554
[45] Date of Patent: Jul. 23, 1996

[54] INTEGRATED ELECTRO-OPTIC PACKAGE FOR REFLECTIVE SPATIAL LIGHT

[75] Inventors: Michael S. Lebby, Apache Junction; George R. Kelly, Gilbert; Karen E. Jachimowicz, Laveen, all of Ariz.

[73] Assignee: Motorola, Schaumburg, Ill.

[21] Appl. No.: 360,509

[22] Filed: Dec. 21, 1994

[51] Int. Cl.[6] ............................ G02F 1/133; G02F 1/03
[52] U.S. Cl. .................. 359/83; 359/63; 359/69; 359/70; 359/253
[58] Field of Search ............................ 359/62, 63, 69, 359/70, 83, 246, 247, 263, 253

[56] References Cited

U.S. PATENT DOCUMENTS

| | | | |
|---|---|---|---|
| 4,690,510 | 9/1987 | Takamatsu et al. | 359/247 |
| 5,113,285 | 5/1992 | Franklin et al. | 359/465 |
| 5,280,371 | 1/1994 | McCartney et al. | 359/69 |
| 5,293,262 | 3/1994 | Adachi et al. | 359/88 |
| 5,404,009 | 4/1995 | Kando et al. | 369/112 |
| 5,412,509 | 5/1995 | Nakata et al. | 359/811 |
| 5,467,215 | 11/1995 | Lebby et al. | 359/247 |
| 5,485,318 | 1/1996 | Lebby et al. | 359/811 |
| 5,486,946 | 1/1996 | Jachimowicz et al. | 359/263 |

*Primary Examiner*—Nelson Moskowitz
*Attorney, Agent, or Firm*—Eugene A. Parsons

[57] ABSTRACT

An array of reflective LCSLM pixels formed on a substrate with a light polarizing layer positioned in overlying relationship to the array. A mounting support includes a waveguide portion having a light input, a light output, and a mirrored surface directing light from the input toward the output, the polarizing layer and the array are mounted on the input. A light source is mounted in the mirrored surface to direct light through the polarizing layer and evenly illuminate the array. Light reflected from the array is directed through the polarizing layer and onto the mirrored surface. A diffuser at the output forms an image plane for the reflected light. Electrical connections are made from the array, through leads in the support and to external contacts.

24 Claims, 5 Drawing Sheets

INTEGRATED ELECTRO-OPTIC PACKAGE FOR REFLECTIVE SPATIAL LIGHT

FIELD OF THE INVENTION

The present invention pertains to reflective spatial light modulators and more specifically to packaging and illumination of reflective spatial light modulator devices.

BACKGROUND OF THE INVENTION

Liquid crystal spatial light modulators (LCSLMs) are very popular at the present time and are utilized in a great variety of direct view type displays, such as digital watches, telephones, lap-top computers and the like. In general, liquid crystal devices are illuminated with a relatively large, separately mounted light source, preferably from the rear (backlighting), so that most of the light travels directly through the liquid crystal and outwardly to the eye of a viewer. Direct view displays require a substantial amount of light for suitable viewing, generally about 25 fL to be visible in office environments and more than 100 fL to be visible in an outdoor environment. To provide this amount of light or luminance at the outlets of the LCSLMs requires a relatively bright, and large, light source.

Further, LCSLMs used in display applications require polarized light and a diffuser placed in the optical path. Light entering the LCSLMs must be polarized, and an analyzing polarizer must be placed in the path of exiting light to differentiate between which LCSLM pixels are ON and which are OFF. A diffuse element, either near the modulating LCSLM or as a screen in a projection system, must be used. Generally, the result is to produce a relatively large and cumbersome package, usually with several discrete components.

This problem severely limits the usefulness of liquid crystal displays. For example, in portable electronic devices such as telephones, two-way radios, pagers, etc. the displays are limited to a few alpha-numeric digits. Generally, if a small portable device is desired, the display must be reduced to a very small number of digits, since the size of the display dictates the minimum size of the device into which it is integrated.

One way to alleviate package size problems is to use a very small liquid crystal spatial light modulator (LCSLM) as the image source, with a magnifying optical system. This can take the form of a projection display, in which light modulated by the liquid crystal is projected by the optical system onto a diffusing screen, or it can take the form of a virtual display, where the optical system creates a large virtual image of the small real image created by the LCSLM.

By using the LCSLM in a reflective mode, a reflective LCSLM is formed, which can be built onto a silicon substrate that contains the drive circuitry and other related electronics. When using this configuration as a virtual image display, the number of discrete components still results in a large and cumbersome package. At present, it is extremely difficult to provide a sufficiently large light source, and to mount the light source and the polarizers so that the reflective LCSLM is properly illuminated and can be viewed conveniently.

Thus, it would be beneficial to have reflective LCSLMs with improved packaging and lighting so they would be more versatile.

It is a purpose of the present invention to provide new and improved integrated electro-optic packaging for reflective spatial light modulators.

It is another purpose of the present invention to provide new and improved integrated electro-optic packaging for reflective spatial light modulators utilizing improved light sources.

It is still another purpose of the present invention to provide new and improved integrated electro-optic packaging for reflective spatial light modulators which are useful in forming a virtual image.

It is a further purpose of the present invention to provide new and improved integrated electro-optic packaging for reflective spatial light modulators which is small and compact enough to be utilized in portable electronic equipment.

It is a still further purpose of the present invention to provide new and improved integrated electro-optic packaging for reflective spatial light modulators which requires a sufficiently small amount of power to be utilized in portable electronic equipment.

It is yet another purpose of the present invention to provide new and improved integrated electro-optic packaging for reflective spatial light modulators which includes molded components that are easily and inexpensively fabricated and assembled.

SUMMARY OF THE INVENTION

The above described problems and others are at least partially solved and the above purposes and others are realized in an integrated electro-optic package for reflective spatial light modulators including an array of reflective spatial light modulator pixels formed on a substrate with each pixel including a control circuit formed in the substrate, each control circuit including control terminals adjacent an outer edge of the substrate, a mirror positioned on the substrate in overlying relationship to the control circuit, and a layer of light modulating material positioned in overlying relationship to the mirror so that light passing through the light modulating material is reflected back through the light modulating material. The package further includes a light polarizing layer positioned in overlying relationship to the array of reflective spatial light modulator pixels. A mounting support including an electrical portion and an optical waveguide portion, with the optical waveguide portion having a light input surface, a light output surface, and a mirrored surface for directing light from the light input surface toward the light output surface is provided with the polarizing layer and the array of reflective spatial light modulator pixels being mounted on the light input surface of the mounting support. A light source is mounted in the mirrored surface of the optical waveguide portion and positioned to direct light through the polarizing layer and onto the array of reflective spatial light modulator pixels with the light source spaced from the array of reflective spatial light modulator pixels, so that light from the light source substantially evenly illuminates the array of reflective spatial light modulator pixels. The array of reflective spatial light modulator pixels is further positioned so that reflected light from the array of reflective spatial light modulator pixels is directed through the polarizing layer, into the light input surface and onto the mirrored surface through the optical portion. A diffuser is mounted in overlying relationship to the light output surface of the optical waveguide portion of the mounting support to form an image plane for reflected light from the array of reflective spatial light modulator pixels.

The above described problems and others are at least partially solved and the above purposes and others are further realized in a method of fabricating an integrated electro-optic package for reflective spatial light modulators including forming the mounting support by some convenient method, such as molding or the like. The mounting support further includes electrical leads positioned to connect to the reflective spatial light modulators and provide an external electrical connection thereto.

BRIEF DESCRIPTION OF THE DRAWINGS

Referring to the drawings.

DESCRIPTION OF THE PREFERRED EMBODIMENTS

Figure 1:
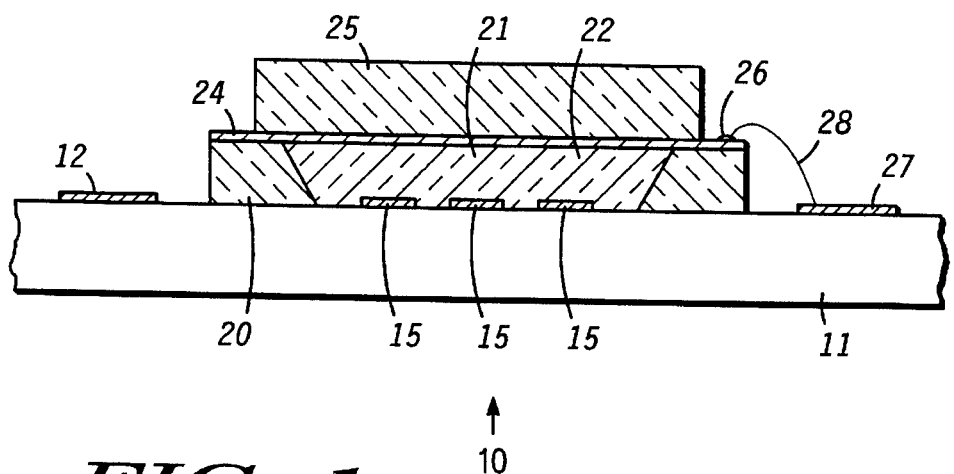
FIG. 1 is a simplified and enlarged sectional view of a reflective liquid crystal spatial light modulator stack.

Referring specifically to FIG. 1, a simplified and enlarged sectional view of a reflective liquid crystal spatial light modulator (LCSLM) stack 10 is illustrated. Stack 10 includes a substrate 11 formed of any convenient semiconductor material, such as silicon, silicon carbide, gallium arsenide, etc. in which integrated electronic circuits can be formed. As will be explained in more detail presently, the integrated electronic circuits include one driver circuit and associated addressing and switching circuitry for each LCSLM pixel formed in stack 10. A plurality of bond or terminal pads 12 are formed adjacent the edges of substrate 11 and are in electrical communication with the integrated electronic circuits so that individual addressing of the electronic circuits is possible.

A two dimensional array of reflective metal pads 15 are formed on the upper surface of substrate 11, which metal pads 15 each define a reflective LCSLM. In the present embodiment, metal pads 15 are made of aluminum or any metal that can be conveniently patterned on the surface of substrate 11 and which will reflect light impinging thereon. Each metal pad of the plurality of metal pads 15 is electrically connected to a driver circuit and addressing and switching circuitry so as to form one contact for activating the liquid crystal material in the space above metal pad 15, forming a pixel.

In this embodiment, metal pads are formed in rows and columns and the addressing and switching circuitry (not shown) includes row and column electrical buses and electronic switches coupled to metal pads 15 so that each metal pad 15 can be individually addressed. The row and column electrical buses are electrically connected to the plurality of bond or terminal pads 12 formed adjacent the edges of substrate 11 for external communication (addressing and controlling) with individual metal pads 15. Further, it should be noted that metal pads 15 along with any driving, addressing and switching circuitry is formed in substrate 11 and coupled to the plurality of bond or terminal pads 12 with pixels defined and formed thereabove.

A generally tubular glass spacer 20 is fixedly attached to the upper surface of substrate 11 by any convenient means, such as adhesive, chemical bonding, growing and etching layers, etc. It will of course be understood that spacer 20 could be formed in a variety of other embodiments and the present structure is illustrated only for purposes of this explanation. Spacer 20 has an inner opening 21 defined therethrough with sufficient size to encircle the two dimensional array of reflective metal pads 15. The cavity formed by opening 21 in spacer 20 in conjunction with the upper surface of substrate 11 is filled with liquid crystal material 22. Typical examples of liquid crystal material which can be used for this purpose are disclosed in U.S. Pat. No. 4,695,650, entitled "Liquid Crystal Compounds and Compositions Containing Same", issued Sep. 22, 1987 and U.S. Pat. No. 4,835,295, entitled "Ferroelectric Liquid Crystal Compounds and Compositions", issued May 30, 1989.

A glass window 25 has a layer 24 of transparent electrically conductive material, such as indium-tin-oxide (ITO) or the like, formed thereon to define a second contact, which, in conjunction with metal pads 15 and liquid crystal material 22 form a complete two dimensional array of LCSLM pixels. Glass window 25 is fixedly attached to the upper surface of glass spacer 20 so that electrically conductive material layer 24 on the lower surface thereof is in contact with liquid material 22 and liquid material 22 is contained within the cavity defined by the upper surface of substrate 11, inner opening of spacer 20 and glass window 25. It will be apparent to those skilled in the art that electrically conductive material layer 24 can be formed in a separate or discrete layer that is simply positioned on glass spacer 20 and partially sandwiched therebetween during assembly.

Electrically conductive material layer 24 is a common second electrical connection for each pixel defined by metal pads 15 and is connected by a conductive lead to a bond pad 26 adjacent the outer edges of glass spacer 20. Bond pad 26 is then electrically connected to a bond pad 27 on substrate 11 by any convenient means, such as wire bond 28, a feed through connector in the edges of glass spacer 20 (not shown), etc. Bond pad 27 is adapted to have applied thereto a common potential, such as ground or some fixed voltage, which in cooperation with various potentials applied to metal pads 15 turn ON, turn OFF, and reset (if necessary) each LCSLM pixel.

It will be understood that various liquid crystal and ferroelectric liquid crystal material can be provided which will operate in different modes in response to different signals or potentials applied thereto. Reflective LCSLMs can be provided, for example, that: rotate the polarization of light impinging thereon when a predetermined potential is applied thereacross and do not rotate the polarization when the potential is removed; rotate the polarization of light impinging thereon when no potential is applied thereacross and do not rotate the polarization when a predetermined potential is applied; rotate the polarization of light impinging thereon when a first predetermined potential is applied thereacross and do not rotate the polarization when a second (lower or higher) potential is applied; etc. Further, common nematic liquid crystal spatial light modulators do not have a memory and do not have to be reset after each application of a potential, but ferroelectric liquid crystal material has a memory and, at least in some applications, ferroelectric liquid crystal spatial light modulators may require a reset (or other modifying) signal between normal switching signals. Generally, the term "activate" or "activating" will be used to indicate that a signal or signals are being applied to or removed from a pixel to cause the pixel to change, regardless of the mode of operation, so as to produce a desired result, which desired result will be apparent.

Glass window 25 completes reflective LCSLM stack 10 which includes a two dimensional array of reflective liquid crystal pixel elements, each of which are individually addressable through bond pads 12. To turn a pixel ON a potential must be applied between the upper and lower contacts for that specific pixel. With no potential applied, the pixel is normally in an OFF condition. Glass plate 25 defines a light input and light output for each of the pixels in the two dimensional array of reflective LCSLMs. While the present embodiment is explained using liquid crystal material in the pixels, it should be understood that other types of spatial light modulators might be utilized in the pixels, including, for example, other types of light modulating liquid or solid material, mirrors or other reflective material, etc.

Figure 2:
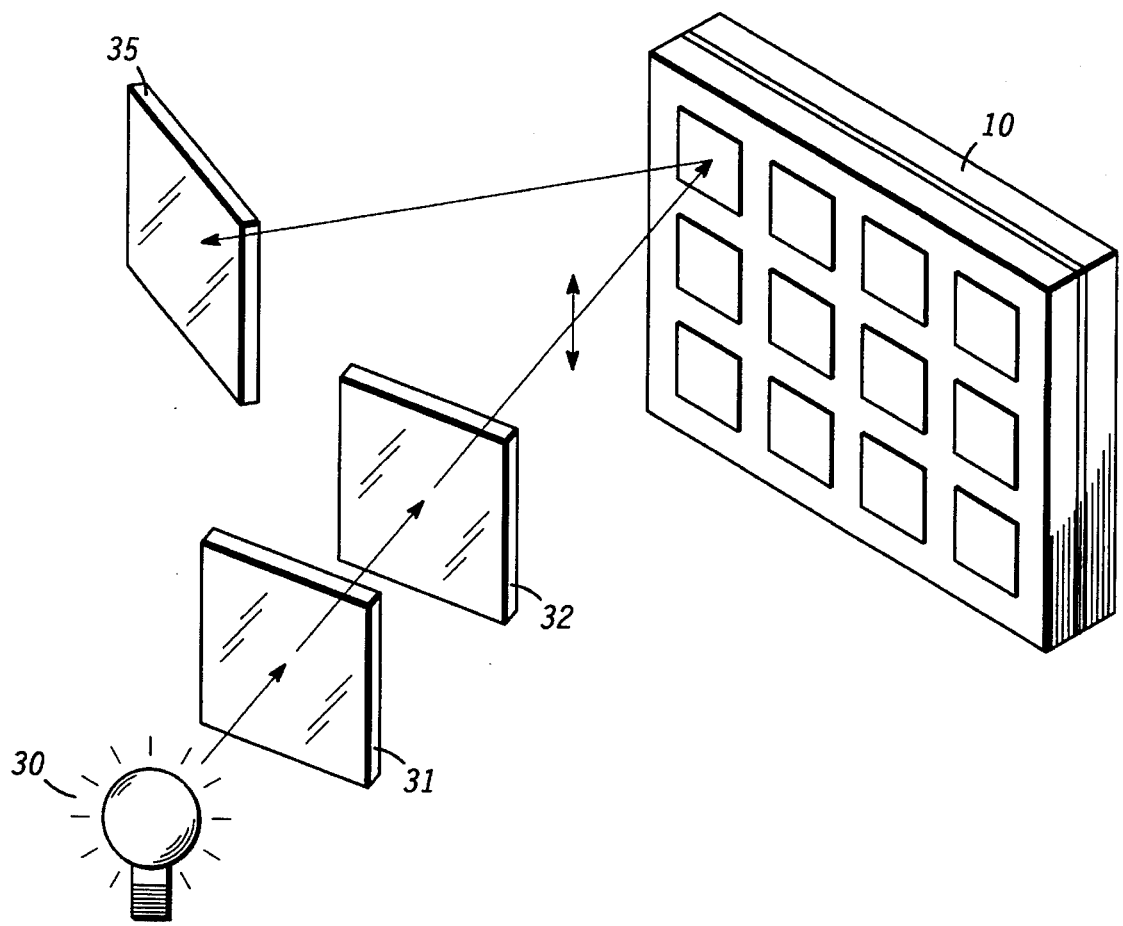
FIG. 2 is a semi-schematic perspective view for illustrating the operation of the reflective liquid crystal spatial light modulator stack.

Referring now to FIG. 2, the operation of reflective LCSLM stack 10 is briefly explained. A light source 30 is provided, which may be any light emitting device capable of providing sufficient light for the operation explained. Light from source 30 is diffused in a plate 31 and polarized in a second plate 32 before illuminating stack 10. Diffusing plate 31 is provided to spread the light from source 30 over stack 10. Polarizing plate 32 polarizes the light into a vertical polarization, for example, prior to the light impinging on stack 10.

The liquid crystal, for example ferroelectric liquid crystal material, in stack 10 rotates the polarization of light passing therethrough when in the activated condition (this operating mode is used only for purposes of this explanation), just as in a standard twisted nematic liquid crystal display. Thus, light passing through glass plate 25 and liquid crystal material 22 and reflected from pads 15 back through liquid crystal material 22 glass plate 25 gets a 90° polarization rotation in each pixel that is activated. For all pixels in the array that are not activated the light passing therethrough is not changed in polarization.

An analyzing polarization plate 35 is positioned so that light reflected through the plurality of pixels in the array of stack 10 passes therethrough. If, for example, plate 35 is polarized horizontally all light reflected from pixels that are activated, which light is rotated 90° in polarization, will pass through plate 35, while light reflected from pixels which are not activated and which is not rotated in polarization will be blocked. If plate 35 is vertically polarized, the same as plate 32, light from pixels which are not activated will pass therethrough and light from pixels which are activated will be blocked. It will be understood that pixels which are constructed to operate in any other mode, such as those described above, may require different orientation of plates 32 and 35.

Figure 3:
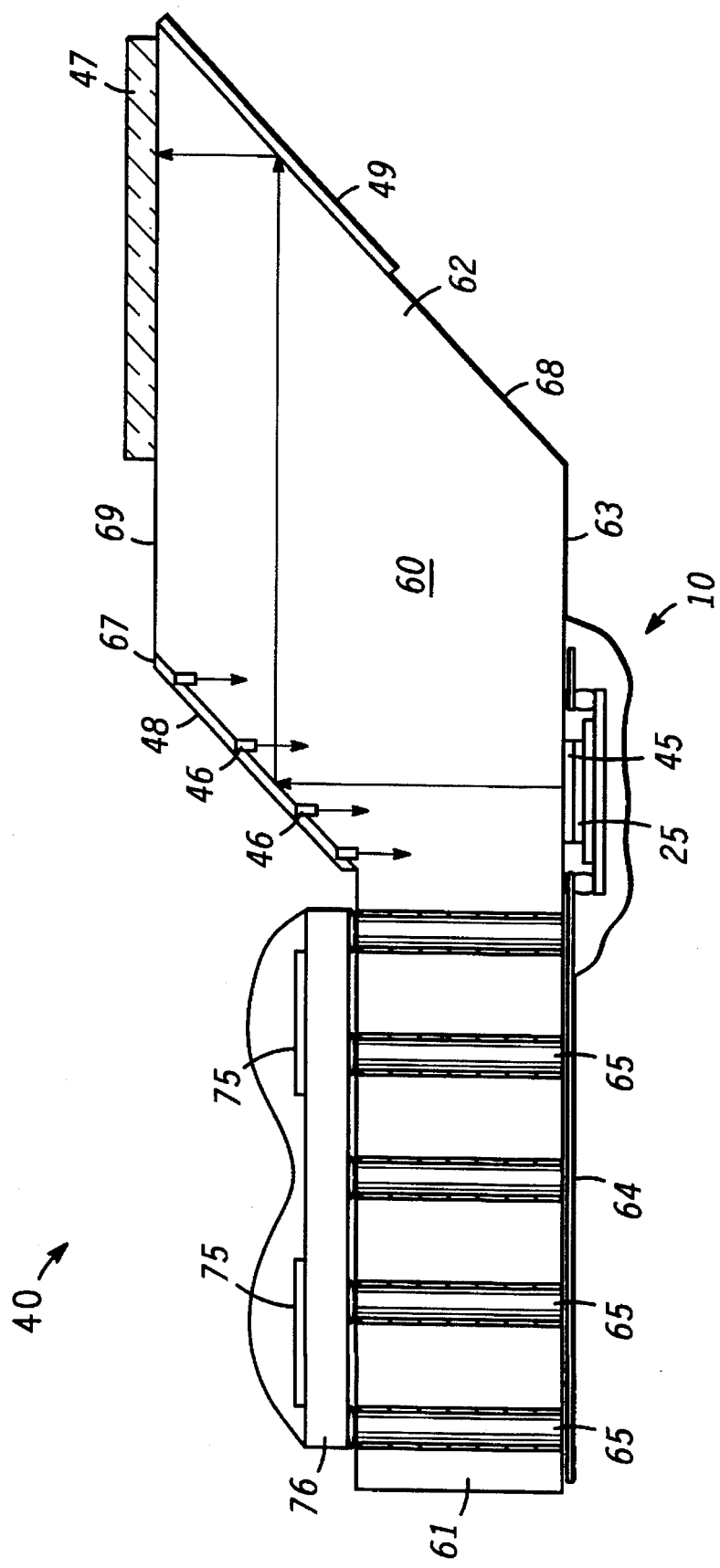
FIG. 3 is a sectional view of an integrated electro-optic package, including a reflective liquid crystal spatial light modulator stack, embodying the present invention.

Referring specifically to FIG. 3, a sectional view of an integrated electro-optical package 40 is illustrated. In this embodiment, a mounting support 60 is provided which includes an electrical (on the left) portion 61 with a generally rectangularly shaped cross-section and an optical (on the right) portion 62, which forms an optical waveguide with a generally parallelogram-shaped cross-section. Mounting support 60 is formed with leads 64 affixed to, or embedded in, a lower surface 63 of both electrical and optical portions 61 and 62. Generally, mounting support 60 is molded of plastic or the like and leads 64 are flexible leadframes embedded therein during the molding operation or affixed to the lower surface thereof by a convenient adhesive or the like.

It should be understood that at least optical portion 62 of mounting support 60 is formed of optically clear plastic and electrical portion 61 can be formed of a convenient material, such as FR4, printed circuit board, inexpensive plastic, etc. which is integrated (physically and electrically) with the optical portion during the molding process. In the present embodiment, entire mounting support 60 is molded as a single piece, or optical waveguide, using any convenient optically clear plastic, such as optically clear liquid epoxy available under a Tradename EPO-TEK 301-2 from EPOXY TECHNOLOGY INC. or a clear epoxy molding compound available under the Tradename HYSOL MG18 from Dexter Corporation. Electrical portion 61 of mounting support 60 has a plurality of feedthrough vias 65 formed therethrough in connection with leads 64 on lower surface 63.

In this specific embodiment, a reflective liquid crystal spatial light modulator (LCSLM) stack 10 (or a spatial light modulator) is connected by some convenient means, such as bump bonding, wire bonding, etc. to lower surface 63 of mounting support 60 in overlying relationship to optical portion 62 and in electrical contact with leads 64. A polarizing plate 45 is positioned between glass plate 25 of stack 10 and lower surface 63 of mounting support 60 so that all light entering or exiting glass plate 25 passes through and is polarized by polarizing plate 45. It will of course be understood that polarizing plate 45 can be a separate, discrete plate positioned on mounting support 60 before mounting stack 10 is positioned thereon, or polarizing plate 45 can be deposited on the surface of glass plate 25, or polarizing plate 45 can be deposited on lower surface 63 of mounting support 60.

One or more light sources 46 are positioned on an angled side surface 67 of optical portion 62 of mounting support 60 opposite and directed toward polarizing plate 45. Side surface 67 of optical portion 62 also has a reflective surface, such as a mirror 48, positioned in overlying relationship thereon. Light sources 46 can be mounted by embedding them in mounting support 60 during molding, by forming holes in mounting support 60 and positioning light sources 46 therein, by forming mirror 48 and light sources. 46 as a single unit or by forming at least portions of mirror 48 as a two way mirror so that light from light sources 46 passes therethrough but light from stack 10 is reflected toward a second mirror 49 on an opposed side 68 of optical portion 62.

Light source or sources 46 can include, for example, a single light emitting diode or several light emitting diodes (as illustrated in FIG. 3) positioned so as to substantially uniformly illuminate stack 10 through polarizing plate 45. For example, currently known GaN LEDs are capable of producing output power of approximately 2 mW at 40 mA, which translates into an output power of approximately 11 lumens/watt.

In another example, three LEDs (a red, a green and a blue LED) are provided on surface 67 and are alternately activated to form three different light sources 46, each of which fully and uniformly illuminates stack 10 at different times. By activating each LCSLM (pixel) in stack 10 in accordance with the amount of each color (red, green, or blue) required in each pixel during the time that that color LED is activated, a complete and full color image is produced for each cycle of the three LEDs. It will of course be understood that more than one LED of each color can be utilized if more than one is required to provide full and uniform illumination.

Patterned electrical leads, or imbedded electrical leads are provided on the rear surface of mirror 48 to provide electrical connections to light sources 46. A plurality of driver circuits 75 are mounted on a support structure 76 (printed circuit board, etc.) by any convenient means, such as bump bonding, wire bonding, etc. Support structure 76 is then mounted on the upper surface of electrical portion 61 of mounting support 60, in this embodiment by bump bonding, so that driver circuits 75 are electrically connected to stack 10 and to external input/output terminals on an externally available surface of electrical portion 62. Light sources 46 are connected to the external input/output terminals through the electrical connections on the upper surface of electrical portion 61. Various inputs (data, power, etc.) are also provided at various points on lower surface 63 of mounting support 60 and connect to the remainder of the circuitry through leads 64. Stack 10 and driver circuits 75 are encapsulated in any well known manner for protection.

An upper surface 69 of optical portion 62 of mounting support 60 is formed to receive a diffuser 47 thereon, which diffuser 47 forms an image plane for light reflected from stack 10. Also, some additional optical elements may be incorporated into mirrors 48 and 49, or between mirrors 48 and 49, and/or attached to the outer surface of diffuser 47 (or surface 69 in overlying engagement with diffuser 47), and/or positioned between polarizer 45 and lower surface 63, especially if the distance between diffuser 47 and polarizing plate 45 is great enough to allow too much spreading of the reflected light. Such additional optical elements can provide additional magnification and/or partial collimation prior to the light impinging upon diffuser 47. These additional elements can be molded into support 60, leaving airgaps which can either be left as airgaps or filled with optical material with a different index of refraction from support 60.

Generally, diffuser 47 is formed as an optical lens which is removeably and/or adjustably mounted on surface 69. In a slightly different embodiment, for example, diffuser 47 is formed in the shape of a disk with external threads on the outer periphery thereof, which threads are threadidly engaged in internal threads of a mounting support (not shown) affixed to surface 69. Thus, diffuser 47 can be easily and quickly moved axially relative to stack 10 to provide focusing of the image formed on diffuser 47. It should be understood that the diffusion required to produce a real image from the light reflected by the array of LCSLMs can be provided by a diffusion element (not shown) positioned between polarizing plate 45 and light source 46, or, in some applications, by a diffusion material positioned on the surfaces of metal plates 15 (in stack 10), or some combination of the above.

Stack 10 is oriented so that light reflected thereby is directed upwardly into optical portion 62 of mounting support 60 toward side surface 67 thereof. Optical elements 48 and 49 direct or guide the light within optical portion 62 toward diffusion lens 47. In this embodiment optical portion 62 is formed into a single optical waveguide for convenience, but it should be understood that diffuser 47, along with additional optical elements, if desired, could be included in optical portion 62, for example, so as to extend between lower surface 63 and upper surface 69 and, thereby, position diffuser 47 closer to polarizer 45.

Thus, a new and improved integrated electro-optic package for reflective SLMs is disclosed which is relatively easy and inexpensive to manufacture. The package ruggedly mounts the various optical components while conveniently integrating electrical connections to the components and providing external connections thereto. Further, light sources, polarizers, a diffuser and, if desired, additional optics are conveniently integrated into a small compact package which is easily integrated into portable electronic equipment. By using LEDs for the light source, the size of the package is further reduced and the electrical power required is also minimized. Also, by using multicolored LEDs, images with partial or full color can be formed.

Figure 4:
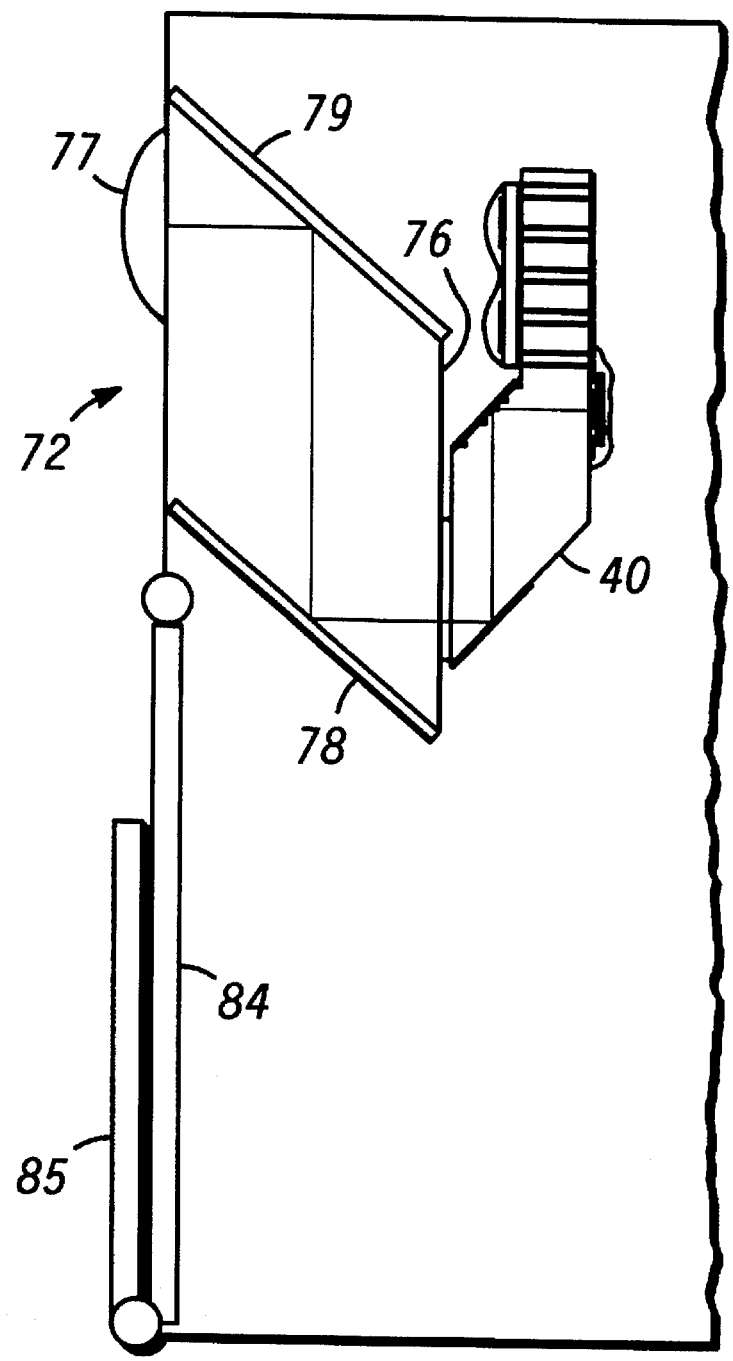
FIG. 4 is a simplified schematic view generally illustrating dual image manifestation apparatus utilizing the integrated electro-optic package illustrated in FIG. 3, movable portions thereof being in a first position.
Figure 5:
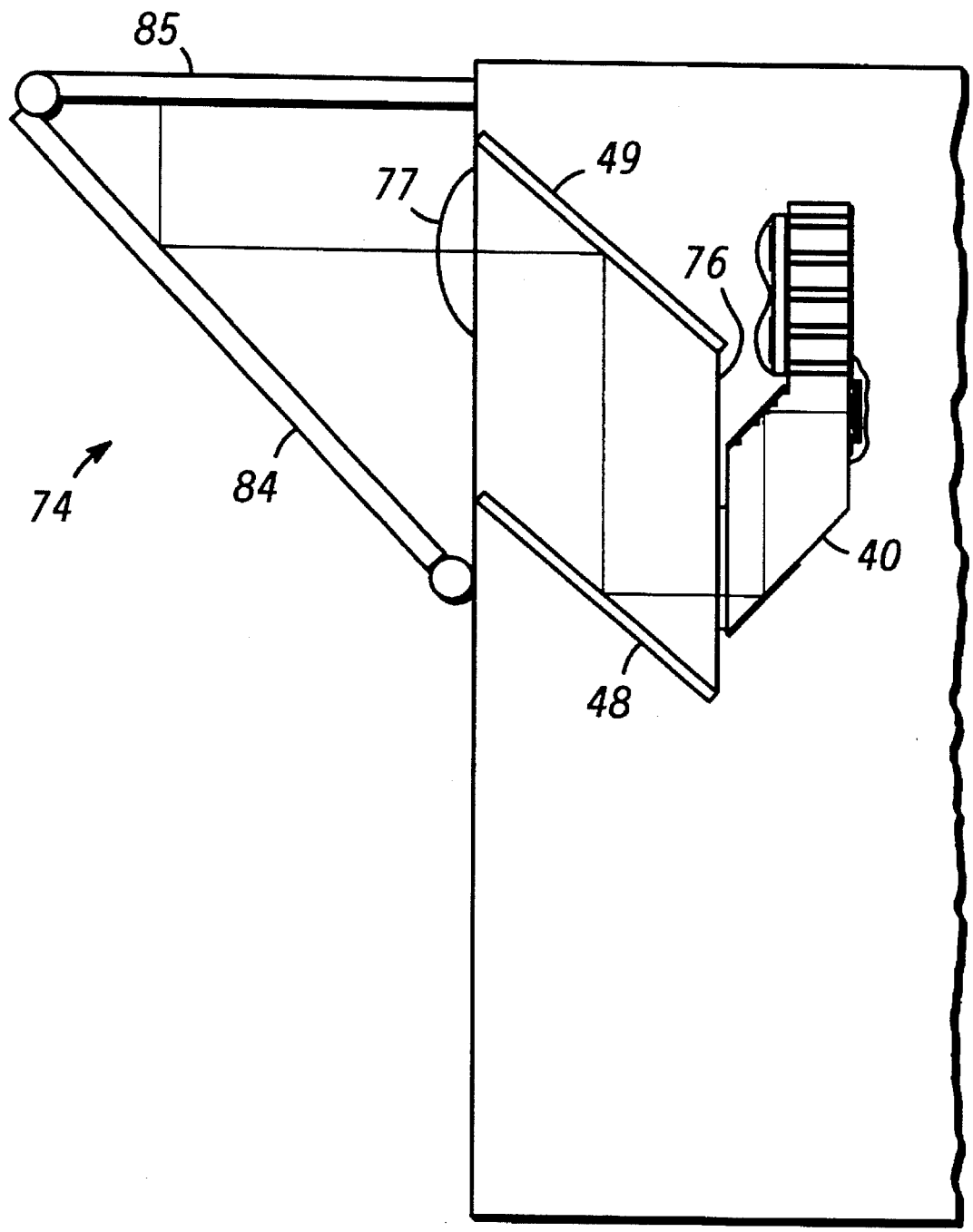
FIG. 5 is a simplified schematic view of the dual image manifestation apparatus illustrated in FIG. 4, movable portions thereof being in a second position.

Referring specifically to FIGS. 4 and 5, simplified schematic views generally illustrating an embodiment of dual image manifestation apparatus, constructed in accordance with the present invention and designated 70, are illustrated. Dual image manifestation apparatus 70 includes first image manifestation apparatus 72 constructed to provide a large virtual image, illustrated in FIG. 4, and second image manifestation apparatus 74 constructed to provide a direct view image, and illustrated in FIG. 5. While separate image manifestation apparatus 72 and 74 are referred to herein for purposes of this explanation, it will be understood by those skilled in the art that apparatus 70 essentially has two modes of operation, which may be designated 72 and 74.

Apparatus 72 includes a real image generator 40, generally similar to integrated electro-optical package 40 illustrated in FIG. 3, affixed in overlying relationship to an optical input of an optical waveguide 76. An optical output of optical waveguide 76 is positioned to be externally available and has a lens system, represented by a single lens 77, affixed thereover. Optical waveguide 76 includes one or more optical elements 78 and 79, which may be Fresnel lenses, reflective elements, refractive elements, diffractive elements, etc. Elements 78 and 79 provide some magnification and may reduce various types of distortion. Lens system 77 is mounted so as to receive the image from optical waveguide 76, magnify it an additional predetermined amount and create the aperture within which a virtual image is viewed. In the present embodiment, optical waveguide 76 and lens system 77 magnify the image a total of approximately twenty times. Generally, a magnification greater than ten (10×) is required to magnify the real image generated by integrated electro-optical package 40 sufficiently to be perceived by a human eye.

Here it should be understood that the virtual image viewed by the operator through lens system 77 is relatively large (e.g. 8.5"×11") and appears to the operator to be several feet behind dual image manifestation apparatus 70. Because of the size of the virtual image produced by image manifestation apparatus 72, a large variety of alpha-numeric and/or graphic images can be easily and conveniently viewed. Further, image manifestation apparatus 72 is very small and compact so that it can easily be incorporated into portable electronic devices, such as pagers, two-way radios, cellular telephones, data banks, etc., without substantially effecting the size or power requirements.

Second image manifestation apparatus 74 (FIG. 5), constructed to provide a direct view image, incorporates a reflective optical element 84 and a screen 85 pivotally attached to a surface of dual image manifestation apparatus 70. Reflective optical element 84 and screen 85 are positioned so that images from lens system 77 are focused on screen 85 (rather than creating a virtual image). Thus, reflective optical element 84 and screen 85, when pivoted into the mode illustrated in FIG. 5, essentially convert virtual image manifestation apparatus 72 into direct view image manifestation apparatus 74. Optical element 84 can also include a Fresnel lens, or the like, for focusing and/or magnification if desired.

Image manifestation apparatus 74 provides a direct view image which can be no larger than screen 85 upon which it is projected. Because of the much smaller size of the direct view image, the amount of magnification required is much smaller, i.e. less than approximately 10×. This smaller magnification is achieved by positioning reflective optical element 84 and screen 85 at a focal point of lens system 77. Generally, while the direct view image is much smaller than the virtual image produced by image manifestation apparatus 72, more power is required to generate the direct view image because more light is required to project the image onto screen 75. However, because the direct view image on screen 85 is smaller, any message contained in the direct view image must be larger in order to be perceived by the operator. Thus, whereas one pixel, or spatial light modulator, in the array of image generator 40 produces one pixel in the final virtual image (for example), several pixels, or spatial light modulators, in the array of image generator 40 may operate in conjunction to produce one pixel in the direct view image on screen 85. This feature can be incorporated into the drive electronics and could be automatically switched or activated when the operator pivots element 84 and screen 85 from a virtual image mode to a direct view mode of operation. Because several pixels, or spatial light modulators, produce one pixel, in many instances the higher power requirement may be automatically resolved. If additional power is required in some applications, drive current to light sources 46 of integrated electro-optic package 10 can also be automatically increased in the direct view mode.

In this specific embodiment the pixels, or spatial light modulators, in stack 10 are formed in a regular, addressable pattern of rows and columns and, by addressing specific pixels by row and column in a well known manner, the specific pixels are activated to produce a real image on diffuser 47. Digital or analog data is received at an input terminal and converted by data processing circuits into signals capable of activating selected spatial light modulators to generate the predetermined real image.

Video from a receiver or other data source within apparatus 70 is communicated to either image manifestation apparatus 72 or 74 for convenient viewing by the operator. Generally, for example, control signals titles, etc. may appear in the direct view image on screen 85 while the virtual image at lens system 77 is used for larger alphanumeric messages and graphics.

Figure 6:
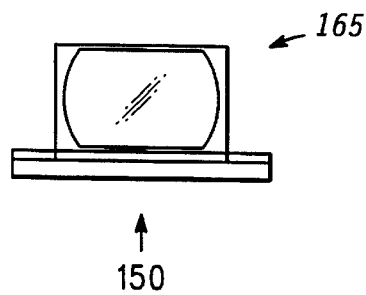
FIGS. 6, 7 and 8 illustrate a front view, side elevational view, and top plan, respectively, of image manifestation apparatus utilizing the integrated electro-optic package illustrated in FIG. 3.
Figure 7:
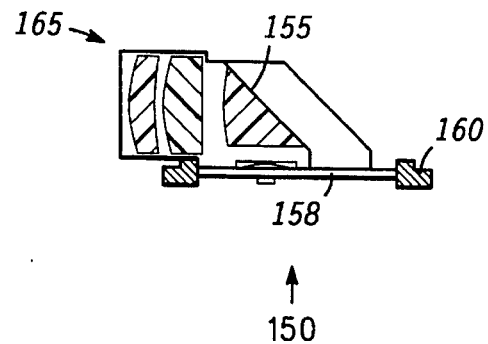
Figure 8:
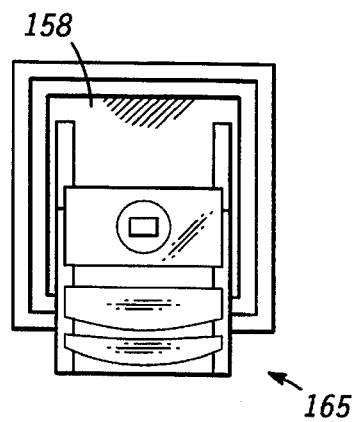

Referring now to FIGS. 6, 7 and 8, another miniature virtual image display 150 in accordance with the present invention, is illustrated in a front view, side elevational view, and top plan, respectively. FIGS. 6, 7 and 8 illustrate miniature virtual image display 150 approximately the actual size to provide an indication as to the extent of the reduction in size achieved by the present invention. Display 150 includes an integrated electro-optic package 155 (generally similar to package 40) which includes, in this specific embodiment, 144 pixels by 240 pixels. Each pixel is fabricated approximately 20 microns on a side with a center-to-center spacing between adjacent pixels of no more than 20 microns. In a preferred embodiment, integrated electro-optic package 155 produces a luminance less than approximately 15 fL. This very low luminance is possible because display 150 produces a virtual image. Further, because a very low luminance is required, LEDs and the like may be utilized as the light source for the SLM stack, which greatly reduces the size and power requirements. Integrated electro-optic package 155 is mounted on the surface of a driver board 158. An optical system 165 is also mounted on driver board 158 and magnifies the image approximately 20× to produce a virtual image approximately the size of an 8.5"×11" sheet of paper.

Here it should be noted that because integrated electro-optic package 155 is very small and the fact that a virtual image is utilized, rather than a direct view display, the overall physical dimensions of miniature virtual image display 150 are approximately 1.5 inches (3.8 cm) wide by 0.75 inches (1.8 cm) high by 1.75 inches (4.6 cm) deep, or a total volume of approximately 2 cubic inches (32 cm$^3$).

Figure 9:
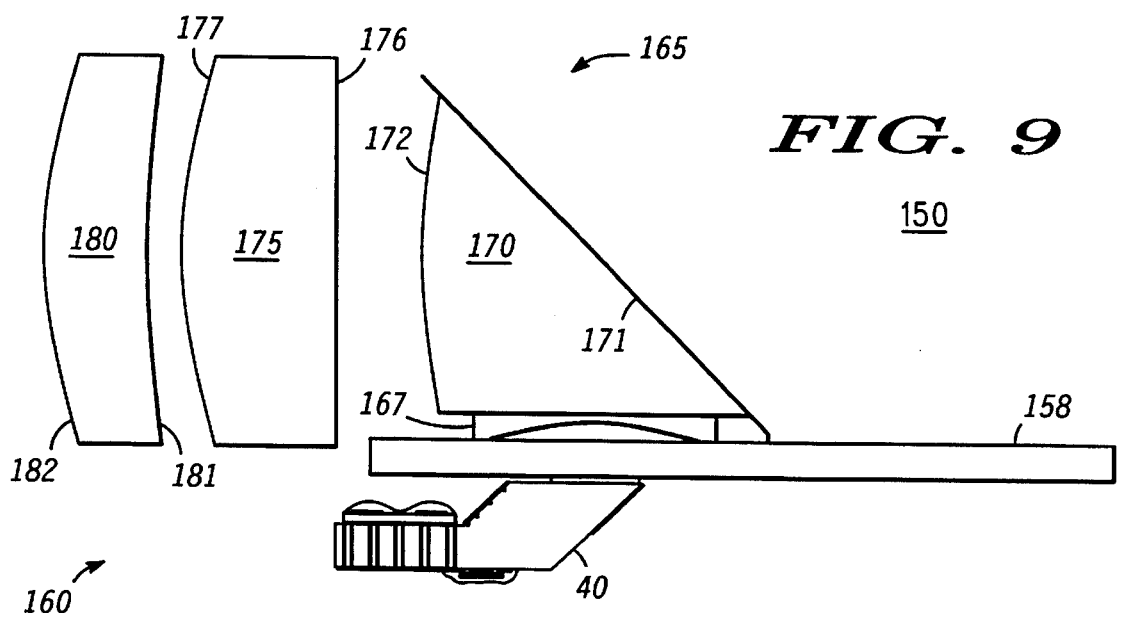
FIG. 9 is a 4× magnified view in side elevation of the apparatus of FIG. 8.

Referring specifically to FIG. 9, a 4× magnified view in side elevation of miniature virtual image display 150 of FIG. 7 is illustrated for clarity. From this view it can be seen that a first optical lens 167 is affixed directly to the upper surface of diffuser 47. An optical prism 170 is mounted to reflect the image from a surface 171 and from there through a refractive surface 172. The image is then directed to an optical lens 175 having a refractive inlet surface 176 and a refractive outlet surface 177. From lens 175 the image is directed to an optical lens 180 having an inlet refractive surface 181 and an outlet refractive surface 182. Also, in this embodiment at least one diffractive optical element is provided on one of the surfaces, e.g. surface 171 and/or surface 176, to correct for aberration and the like. The operator looks into surface 182 of lens 180 and sees a large, easily discernible virtual image which appears to be behind display 150.

It should be noted that in the prior art, pagers and other small receivers in which visual displays are desired, are especially handicapped by the size of the displays. Generally such displays are limited to a single short line of text or several digits, and the size of the display still dictates the size of the receiver. Utilizing an embodiment of the present invention (e.g. that of FIGS. 6–9), a display with several lines of text to a full page can be incorporated and the size of the receiver or other portable electronic equipment can be substantially reduced. Further, the display is clearer and easier to read and, because it utilizes a virtual display, requires very little power for the operation thereof. In fact, the present display uses much less power than any of the direct view displays normally utilized in electronic equipment and, as a result, can be fabricated in much smaller sizes.

Thus a greatly improved portable electronic device with miniature virtual image display is disclosed, which incorporates an extremely small spatial light modulator array on a semiconductor chip. Because a virtual image display is utilized, the display is constructed very small and requires very little power. Further, because of the extremely small size and power consumption of the virtual image display, it is incorporated into portable electronic equipment without substantially effecting the size or power requirements. The miniature virtual display provides a predetermined amount of magnification along with sufficient eye relief and lens working distance to create a comfortable and viewable virtual image. Also, a complete virtual image is produced with no moving parts or power consuming motors and the like. Further, the electronics provided as a portion of the miniature virtual image display allows a variety of very small real images to be generated, e.g. alpha-numeric and/or graphic. The very small real image is magnified into a large virtual image that is easily perceived by the operator.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An integrated electro-optic package for reflective spatial light modulators comprising:

an array of reflective spatial light modulator pixels formed on a substrate with each pixel including a control circuit formed in the substrate, each control circuit including control terminals adjacent an outer edge of the substrate, a mirror positioned on the substrate in overlying relationship to the control circuit, and spatial light modulator material positioned in overlying relationship to the mirror so that light passing through the spatial light modulator material is reflected back through the spatial light modulator material;

a light polarizing layer positioned in overlying relationship to the array of reflective spatial light modulator pixels;

a mounting support including an electrical portion and an optical waveguide portion, with the optical waveguide portion having a light input surface, a light output surface, and a mirrored surface for directing light from the light input surface toward the light output surface, the polarizing layer and the array of reflective spatial light modulator pixels being mounted on the light input surface of the mounting support;

a light source mounted in the mirrored surface of the optical waveguide portion and positioned to direct light through the polarizing layer and onto the array of reflective spatial light modulator pixels with the light source spaced from the array of reflective spatial light modulator pixels, so that light from the light source substantially evenly illuminates the array of reflective spatial light modulator pixels, the array of reflective spatial light modulator pixels being positioned so that reflected light from the array of reflective spatial light modulator pixels is directed through the polarizing layer, into the light input surface and onto the mirrored surface through the optical portion; and a diffuser mounted in overlying relationship to the light output surface of the optical waveguide portion of the mounting support to form an image plane for reflected light from the array of reflective spatial light modulator pixels.

2. An integrated electro-optic package for reflective spatial light modulators as claimed in claim 1 wherein at least the optical waveguide portion of the mounting support is optically clear plastic.

3. An integrated electro-optic package for reflective spatial light modulators as claimed in claim 2 wherein the optically clear plastic has a temperature coefficient of expansion that is substantially similar to the array of reflective spatial light modulator pixels' temperature coefficient of expansion.

4. An integrated electro-optic package for reflective spatial light modulators as claimed in claim 1 wherein at least the optical waveguide portion of the mounting support is molded optically clear plastic.

5. An integrated electro-optic package for reflective spatial light modulators as claimed in claim 1 wherein the light source includes a light emitting diode.

6. An integrated electro-optic package for reflective spatial light modulators as claimed in claim 5 wherein the light source includes at least two light emitting diodes, each of which emit a different color of light.

7. An integrated electro-optic package for reflective spatial light modulators as claimed in claim 1 wherein the optical waveguide portion of the mounting support includes a molded optically clear plastic and the light source is a plurality of light emitting diodes embedded in the optically clear plastic.

8. An integrated electro-optic package for reflective spatial light modulators as claimed in claim 1 where, in the array of reflective spatial light modulator pixels, the layer of spatial light modulator material is a continuous layer across the entire array and each control circuit for each pixel formed in the substrate includes one contact, the array further including an optically clear contact positioned on an opposite side of the continuous layer with the one contact and the optically clear contact defining a pixel within the continuous layer.

9. An integrated electro-optic package for reflective spatial light modulators as claimed in claim 8 wherein the spatial light modulator material includes liquid crystal material.

10. An integrated electro-optic package for reflective spatial light modulators as claimed in claim 8 wherein the liquid crystal material includes ferroelectric light crystal material.

11. An integrated electro-optic package for reflective spatial light modulators as claimed in claim 8 wherein the optically clear contact for each pixel is formed in a layer if indium-tin-oxide deposited in overlying relationship to the continuous layer of spatial light modulator material.

12. An integrated electro-optic package for reflective spatial light modulators as claimed in claim 8 wherein the mirror positioned on the substrate is a polished pad of metal, one for each pixel, which pad of metal also forms the one contact included in the control circuit.

13. An integrated electro-optic package for reflective spatial light modulators as claimed in claim 10 wherein the polished pad of metal for each pixel is a polished pad of aluminum.

14. An integrated electro-optic package for reflective spatial light modulators as claimed in claim 1 wherein the electrical portion of the mounting support includes leads formed in the electrical portion so as to be in electrical contact with the control terminals adjacent an outer edge of the substrate of each control circuit and the leads further extend to an external portion of the housing to form external contacts for the control circuits.

15. An integrated electro-optic package for reflective spatial light modulators as claimed in claim 14 wherein the electrical portion of the mounting support is molded and the leads are a leadframe molded into the electrical portion of the mounting support.

16. An integrated electro-optic package for reflective liquid crystal spatial light modulators comprising:

a reflective liquid crystal spatial light modulator stack including a substrate with a plurality of control circuits formed therein, each control circuit including control terminals adjacent an outer edge of the substrate and an electrical contact mirror positioned on the substrate, each electrical contact mirror defining a pixel and a first electrical contact for the pixel, a layer of liquid crystal spatial light modulator material positioned in overlying relationship to the electrical contact mirrors so that light passing through the liquid crystal spatial light modulator material is reflected back through the liquid crystal spatial light modulator material, and an electrically conductive optically transparent layer of material positioned on an opposite surface of the liquid crystal spatial light modulator material to form a second electrical contact for each pixel;

a light polarizing layer positioned in overlying relationship to the reflective liquid crystal spatial light modulator stack;

a mounting support including an electrical portion and an optical waveguide portion, with the optical waveguide portion having a light input surface, a light output surface, and a mirrored surface for directing light from the light input surface toward the light output surface, the polarizing layer and the reflective liquid crystal spatial light modulator stack being mounted on the light input surface of the mounting support;

a light source mounted in the mirrored surface of the optical waveguide portion and positioned to direct light through the polarizing layer and onto the reflective liquid crystal spatial light modulator stack with the light source spaced from the reflective liquid crystal spatial light modulator stack, so that light from the light source substantially evenly illuminates the reflective liquid crystal spatial light modulator stack, the array of reflective liquid crystal spatial light modulator stack being positioned so that reflected light from the reflective liquid crystal spatial light modulator stack is directed through the polarizing layer, into the light input surface and onto the mirrored surface through the optical portion; and a diffuser mounted in overlying relationship to the light output surface of the optical waveguide portion of the mounting support to form an image plane for reflected light from the reflective liquid crystal spatial light modulator stack.

17. An integrated electro-optic package for reflective liquid crystal spatial light modulators as claimed in claim 16 wherein the layer of liquid crystal spatial light modulator material is contained within a closed cavity having internal opposed flat surfaces, the electrical contact mirrors are affixed to one of the internal surfaces and the electrically conductive optically transparent layer is affixed to the other of the internal surfaces.

18. An integrated electro-optic package for reflective liquid crystal spatial light modulators as claimed in claim 17 wherein the closed cavity is defined by a surface of the substrate, a spacer affixed to the surface of the substrate and a glass plate affixed over the spacer.

19. An integrated electro-optic package for reflective liquid crystal spatial light modulators comprising:

a reflective liquid crystal spatial light modulator stack including
a substrate with a plurality of control circuits formed therein, each control circuit including control terminals adjacent an outer edge of the substrate and an electrical contact mirror positioned on the substrate, each electrical contact mirror defining a pixel and a first electrical contact for the pixel,
a layer of liquid crystal spatial light modulator material positioned in overlying relationship to the electrical contact mirrors so that light passing through the liquid crystal spatial light modulator material is reflected back through the liquid crystal spatial light modulator material,
an electrically conductive optically transparent layer of material positioned on an opposite surface of the liquid crystal spatial light modulator material to form a second electrical contact for each pixel, and
the layer of liquid crystal spatial light modulator material being contained within a closed cavity having internal opposed flat surfaces and defined by a surface of the substrate, a spacer affixed to the surface of the substrate and a glass plate affixed over the spacer with the electrical contact mirrors affixed to one of the internal surfaces and the electrically conductive optically transparent layer affixed to the other of the internal surfaces;

a light polarizing layer;

a mounting support including an electrical portion and an optical waveguide portion, with the optical waveguide portion having a light input surface, a light output surface, and a mirrored surface for directing light from the light input surface toward the light output surface, the polarizing layer and the reflective liquid crystal spatial light modulator stack being mounted on the light input surface of the mounting support;

a light source mounted in the mirrored surface of the optical waveguide portion and positioned to direct light through the polarizing layer and onto the reflective liquid crystal spatial light modulator stack with the light source spaced from the reflective liquid crystal spatial light modulator stack, so that light from the light source substantially evenly illuminates the reflective liquid crystal spatial light modulator stack, the array of reflective liquid crystal spatial light modulator stack being positioned so that reflected light from the reflective liquid crystal spatial light modulator stack is directed through the polarizing layer, into the light input surface and onto the mirrored surface through the optical portion;

a diffuser mounted in overlying relationship to the light output surface of the optical waveguide portion of the mounting support to form an image plane for reflected light from the reflective liquid crystal spatial light modulator stack; and the electrical portion of the mounting support including leads formed in the electrical portion so as to be in electrical contact with the control terminals adjacent an outer edge of the substrate of each control circuit and the leads further extend to an external portion of the mounting support to form external contacts for the control circuits.

20. A method of fabricating an integrated electro-optic package for reflective spatial light modulators comprising the steps of:

providing a stack including a plurality of reflective spatial light modulators formed in a two dimensional array on a semiconductor substrate with drive electronics formed in the substrate for each spatial light modulator of the array of spatial light modulators and control terminals for the drive electronics positioned adjacent outer edges of the substrate, the stack further including a light transparent surface defining a light input and light output for each of the spatial light modulators in the two dimensional array of reflective spatial light modulators;

forming a mounting support including an electrical portion and an optical waveguide portion, with the optical waveguide portion having a light input surface, a light output surface, and a mirrored surface for directing light from the light input surface toward the light output surface, the polarizing layer and the stack being mounted on the light input surface of the mounting support, the electrical portion being formed to include a plurality of electrical leads each positioned therein so as to provide a first internal electrical contact in electrical communication with the control terminals for the drive electronics and a second, electrical contact at an external surface of the mounting support;

providing a light polarizing layer and positioning the light polarizing layer in overlying relationship to the light input surface of the mounting support;

positioning the stack in overlying relationship to the polarizing layer;

mounting a light source in the mirrored surface of the optical waveguide portion and positioning the light source to direct light through the polarizing layer and onto the stack with the light source spaced from the stack, so that light from the light source substantially evenly illuminates the stack, the stack being positioned so that reflected light from the stack is directed through the polarizing layer, into the light input surface and onto the mirrored surface through the optical portion; and diffusing light reflected from the stack to form an image.

21. A method of fabricating an integrated electro-optic package for reflective spatial light modulators as claimed in claim 20 wherein the step of diffusing includes mounting a diffuser in overlying relationship to the light output surface of the mounting support to form an image plane for light reflected from the stack and passing through the polarizing layer and the optical waveguide portion of the mounting support.

22. A method of fabricating an integrated electro-optic package for reflective spatial light modulators as claimed in claim 20 wherein the step of forming a mounting support includes molding the mounting support from plastic.

23. A method of fabricating an integrated electro-optic package for reflective spatial light modulators as claimed in claim 22 wherein the step of molding the mounting support from plastic includes a step of molding a leadframe into the plastic to form the plurality of electrical leads.

24. A method of fabricating an integrated electro-optic package for reflective spatial light modulators as claimed in claim 23 wherein the step of molding the mounting support from plastic and the step of mounting a light source in the mirrored surface include forming the mounting support with an angled surface spaced from the light input surface and in a generally opposed relationship thereto and positioning at least one light emitting diode and forming a mirror on the angled surface.

* * * * *